June 17, 1930.  M. SCHNAIER  1,764,282
FROZEN CONFECTIONERY
Filed Dec. 23, 1927
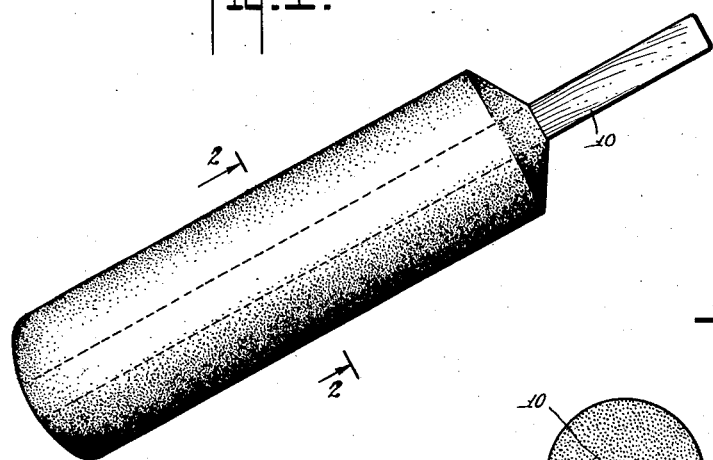
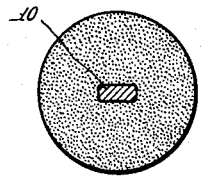
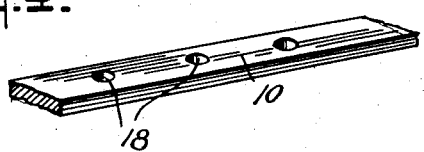
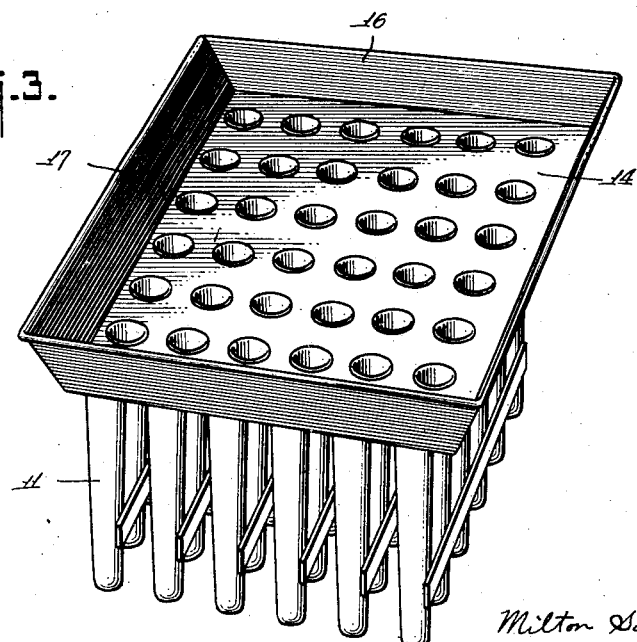
INVENTOR.
Milton Schnaier
BY
Dean, Fairbank, Obright & Hirsch
his ATTORNEYS.

Patented June 17, 1930

1,764,282

UNITED STATES PATENT OFFICE

MILTON SCHNAIER, OF NEW YORK, N. Y.

FROZEN CONFECTIONERY

Application filed December 23, 1927, Serial No. 242,110, and in Sweden August 5, 1927.

The invention provides a frozen confection of small bulk for individual consumption having a relatively smooth or polished surface, presenting a hard porous or cellular icy frame work within the interstices of which is lodged a substance rich in sugar and flavoring material. Preferably the confection is firmly embodied in a unitary construction with a handle stick.

While the confection may be produced according to various methods, I prefer to pour a syrup including water, flavoring matter and sugar into cylindrical molds of the appropriate size, to insert the handle sticks into the molds, then to apply intense refrigeration. In this process, which is carried out without agitation of the syrup, the water constituent freezes first to form the icy frame work or honeycomb within the interior of which the flavoring matter then freezes at lower temperature.

The cold mass of confection withdrawn from the inner surface of the mold tube has a relatively hard and polished surface upon which moisture from the atmosphere can condense in the manner of hoar frost as it is held in the hand preparatory to eating. The confection remains solid for a long time, even in the sun and does not begin dripping for many minutes.

The syrup freezing last, it follows, that when suction of the mouth is applied to the confection the syrup and flavoring matter may be drawn or sucked out, affording a relatively concentrated chilled drink and leaving behind a relatively white or colorless body of snow or ice. The icy frame work thus serves as a hard spongy container for the syrup.

In the accompanying drawings in which I have illustrated a preferred embodiment of the confection and of apparatus for producing the same, Fig. 1 is a side elevation of the confection, Fig. 2 is a cross-section thereof, Fig. 3 is a perspective view of a preferred mold for making the confection, and Fig. 4 is a fragmentary perspective view of a modification.

The syrup may be of any flavor including natural and artificial fruit flavors, chocolate, coffee, mint, ginger ale, etc. Preferably water is used as the carrying medium, although in certain cases as, for instance, with chocolate, skimmed or whole milk may be used. In general, the original syrup is a concentrate or emulsion.

The handle stick employed by me is preferably of a wood, such as seasoned birch, which will not impart taste or color to the confection. The sticks 10 are of flat construction, and are appropriately finished by abrasion, so as to be quite smooth and without splinters. The sticks are preferably water logged before use, so that when in the filled molds 11, they will be sufficiently heavy to touch bottom. The syrup in the molds is frozen without agitation thereof under intense refrigeration at a temperature of preferably slightly below zero degrees F., so that with a mold ¾ inches internal diameter, the freezing is completed in less than 15 minutes. As the stick is thin, the confection 12 is not only frozen about the stick, but through the stick as well, so that the product is tightly keyed thereonto. If desired, the stick may also be perforated at the part about which the confection is frozen to further enhance the security of hold. As shown for instance in Fig. 4 the stick 10' may be provided with holes 18 at the part thereof enclosed by the confection. The flat stick has considerable strength and affords a convenient surface for imprinting the trademark and other designation thereon at the exposed part of its length.

The mold illustratively shown in Fig. 3 includes a base plate 14 into which the rims of metal molds 11 are preferably crimped or soldered. The plate has a rim 16, one side of which is a pouring lip 17, from which excess syrup may be poured off to maintain the syrup at correct level in each of the molds.

After the confection is frozen sufficiently hard in the mold, the mold may be immersed in tepid water and reversed and the contents dumped out, or if desired, the individual confections may be removed by pulling them out by the protruding handle portions. The confections are preferably sold and dispensed in individual wrappers or bags of parchment paper or the equivalent.

It will thus be seen that there is herein described an article and a method in which the several features of the invention are embodied, and which article and method in use attain the various objects of the invention and are well suited to meet the requirements of practical use.

As many changes could be made in the above article and method and many apparently widely different embodiments of this invention could be made without departing from the scope thereof, it is intended that all matter contained in the above description or shown in the accompanying drawings shall be interpreted as illustrative and not in a limiting sense.

I claim:

1. The method of preparing a frozen confection, which consists in water-logging a handle and core stick, depositing the same in a mold, charging the mold with a syrup, congealing the contents under intense refrigeration, and then removing from the mold the frozen product, thereby bonded to the core length of the stick.

2. A frozen confection having a porous core with a protruding length comprising a handle, said confection including substantially unflavored ice frozen through the pores of the core, the flavored frozen confection being bonded by freezing to the core and to the icy portion that protrudes from the stick surface.

3. A generally cylindrical frozen confection having a flat core stick extending the entire length thereof and protruding therebeyond from one end, the confection being frozen about and through the stick, the substance frozen through the stick being more dilute than the substance constituting the confection.

4. A frozen confection comprising a flat stick including a core portion extending substantially the length of the confection and a handle protruding beyond the confection portion, the core portion of said stick having perforations therein, said confection frozen about the core portion of the stick and through the perforations thereof for a secure bonding connection, said stick being of porous material, the substance frozen through the material of said stick being more dilute than the substance making up the confection.

Signed at New York, in the county of New York and State of New York this 21st day of December, A. D. 1927.

MILTON SCHNAIER.